United States Patent [19]

Blum

[11] Patent Number: 5,475,867
[45] Date of Patent: Dec. 12, 1995

[54] DISTRIBUTED SUPERVISORY CONTROL AND DATA ACQUISITION SYSTEM

[75] Inventor: William R. Blum, Huntington Sta., N.Y.

[73] Assignee: Itron, Inc., Spokane, Wash.

[21] Appl. No.: 833,467

[22] Filed: Feb. 6, 1992

[51] Int. Cl.$^6$ ..................................... H04B 7/00
[52] U.S. Cl. ...................... 455/53.1; 455/33.1; 455/54.1; 455/56.1
[58] Field of Search .................. 455/32.1, 53.1, 455/54.1, 54.2, 68, 33.1, 56.1, 49.1, 88; 340/825.47, 825.44, 825.52

[56] References Cited

U.S. PATENT DOCUMENTS

| | | |
|---|---|---|
| 4,589,075 | 5/1986 | Buennagel . |
| 4,644,351 | 2/1987 | Zabarsky et al. ............... 455/53.1 |
| 4,716,410 | 12/1987 | Nozaki ..................... 340/825.52 |
| 4,875,231 | 10/1989 | Hara et al. . |
| 4,905,080 | 2/1990 | Watanabe ..................... 358/84 |
| 4,912,756 | 3/1990 | Hop ........................... 379/63 |
| 4,914,686 | 4/1990 | Hagar, III et al. . |
| 4,930,011 | 5/1990 | Kiewit ......................... 358/84 |
| 4,955,070 | 9/1990 | Welsh ....................... 358/84 X |
| 5,111,198 | 5/1992 | Kuszmaul ................... 340/825.52 |
| 5,129,096 | 7/1992 | Burns ......................... 455/54.1 |
| 5,187,806 | 2/1993 | Johnson et al. ............... 455/33.1 |

Primary Examiner—Reinhard J. Eisenzopf
Assistant Examiner—Nguyen Vo
Attorney, Agent, or Firm—Townsend and Townsend

[57] ABSTRACT

A SCADA communication and control system is used for controlling power distribution. The system includes a master controller, a master ratio and a plurality of remote terminal units (RTUs). A communication link between the master controller and the master radio has two channels. A first channel is for sending master controller messages to the master radio. The second channel is for the master radio to send the RTU response messages back to the master controller. A supplemental controller along with supplemental remote terminal units (SRTUs) also are included for expanding the range of the system. A switch is included in the second channel so as to selectively link either the supplemental controller or the master radio to the master controller for providing response messages. The supplemental controller monitors the first channel to identify messages having an SRTU address. When such a message is identified, the switch is set to select the supplemental controller. In addition, the master radio is disabled from transmitting over the 900 MHz radio channel. Thus for SRTU communications, the supplemental controller has access to the 900 MHz channel and the response link back to the master controller. The supplemental controller includes a main task for monitoring and testing master controller messages. The main task defines the switch state and enables/disables the master radio access to the 900 Mhz channel. A network task also is included which controls communications with the SRTUs, either directly or through a sub-controller.

12 Claims, 4 Drawing Sheets

| FIG. 4A. |
| FIG. 4B. |

DISTRIBUTED SUPERVISORY CONTROL AND DATA ACQUISITION SYSTEM

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent and Trademark Office file or records, but otherwise reserves all copyright rights whatsoever.

BACKGROUND OF THE INVENTION

This invention relates to a communication and control system, and more particularly to a distributed supervisory control and data acquisition ("SCADA") system.

A SCADA communication and control system is a wide area network of remote terminal units communicating by short bursts at the 900 MHz radio frequency range. The remote terminal units are, e.g., power control stations used by a utility company for controlling power distribution over a specific area. A typical SCADA system 10 is shown in FIG. 1, including a master controller 12 coupled to a master radio unit 14 via modem 16 and microwave link 18. Messages from the master controller 12 are sent to the master radio 14 for broadcast to multiple remote terminal units 22. By including only one master radio 14, however, the network communication distances are limited, especially in rugged terrain. Further, by using telephone-type modems 16, acquisition times are relatively slow. Accordingly, there is a need for systems having enhanced range and throughput.

SUMMARY OF THE INVENTION

According to the invention, a conventional SCADA system is expanded to include a supplemental controller and additional remote terminal units which share the same radio channels. A master controller controls the power distribution over the network of remote terminal units (RTUs) and supplemental remote terminal units (SRTUs). The supplemental controller enables an expanded network by monitoring master controller messages and generating response messages for the SRTUs.

According to one aspect of the invention, the supplemental controller monitors master controller transmissions to identify messages destined for one or more of the SRTUs. When a SRTU destination address is identified, the supplemental controller takes control of the 900 MHz transmission channel and the master controller link. The supplemental controller then transmits the message to the destination SRTU. The SRTU performs the requested command and responds with status information and, depending on the specified function, analog information. The supplemental controller then generates a response message which is sent back to the master controller over the master controller link. Thus, the supplemental controller receives the master controller messages destined for the SRTUs, sends such messages in the form of supplemental controller messages to the SRTUs for processing and response, then generates and sends the response message back to the master controller.

According to another aspect of the invention, the supplemental controller performs a main task and a network task which interface through an SRTU database. The main task monitors and tests the master controller messages. The network task maintains the communications with the SRTUs, directly or through sub-controllers. The network task enters SRTU response information into the SRTU database. The main task accesses such database to generate the response message which is sent back to the master controller.

According to another aspect of the invention, the system includes a two-channel master controller link. A switch is positioned along one channel for coupling response transmission channels of the supplemental controller and master radio to the master controller. When the main task determines that a message has an SRTU address, then the task sets the switch to select the supplemental controller response transmission channel. The other channel of the link also is coupled to the master radio and supplemental controller. The master controller transmits messages along such channel, while the supplemental controller monitors such channel to test for SRTU destination addresses.

DESCRIPTION OF SPECIFIC EMBODIMENTS

System Overview

Figure 1:
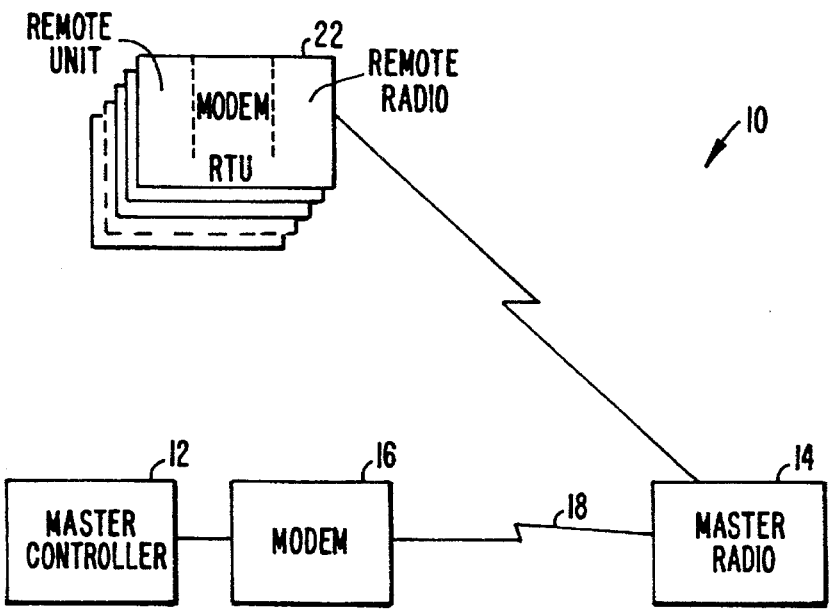
FIG. 1 is a block diagram of a prior art SCADA system.
Figure 2:
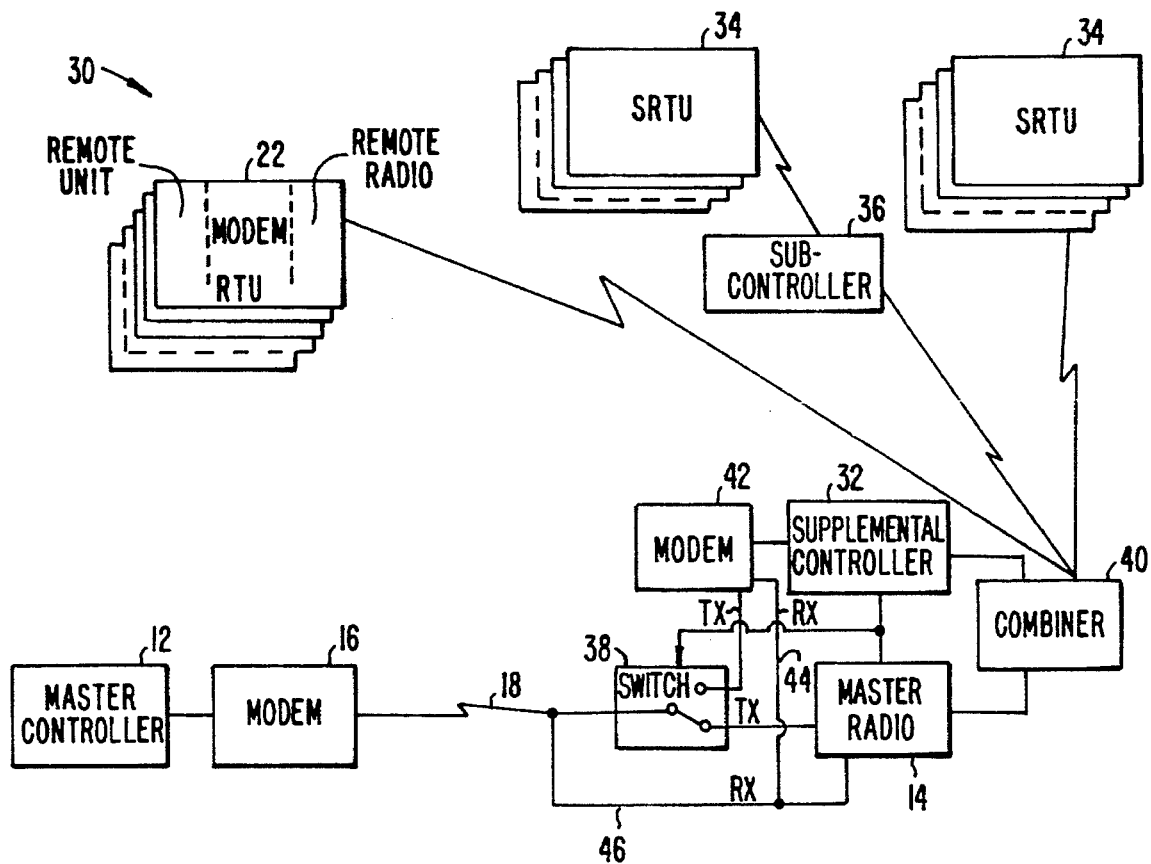
FIG. 2 is a block diagram of a distributed SCADA communication and control system according to an embodiment of this invention.

FIG. 2 shows a distributed SCADA communication and control system 30 according to an embodiment of this invention. The function of the system 30 is to control and monitor remote terminal units 22, 34 over a relatively larger area than achievable by the prior art system 10. As previously described the prior art system 10 has limited range due to the use of a single master radio 14. The system 30 includes the conventional system 10 of FIG. 1, along with supplemental remote terminal units and control circuitry. Expanded range is achieved in the system 30 by including a supplemental controller 32 for controlling and monitoring supplemental remote terminal units (SRTU) 34 and sub-controllers 36. In one embodiment the system portion including sub-controllers 36, SRTU's 34 and embedded software such as in controllers 36 and SRTU's 34 is formed by a conventional distribution automation 4,system available from Itron, Inc. of Spokane, Wash.—as model number 500-0233-001; 500-0234-001; and/or 500-0208-001.

The supplemental controller 32 is installed at an existing master radio 14 site, along with a combiner 40. The combiner 40 enables the supplemental controller 32 and master radio 14 to share the same antenna for data transmission to SRTUs 34 and RTUs 22. To achieve added range, one or more sub-controllers 36 is included for relaying transmissions from the supplemental controller 32 to an SRTU 34 or another sub-controller (not shown).

The system 30 also includes a modem 42 which is coupled to microwave link 18 via signal paths 44 and 46. The modem 42 bridges communications from the master controller 12 to the supplemental controller 32, enabling the supplemental controller 32 to monitor communications. When the supplemental controller 32 identifies a communication requiring information from or about an SRTU 34, the supplemental controller 32 generates a signal for disabling transmission by the master radio 14. The supplemental controller 32 also generates a signal for controlling switch 38 to couple the microwave link 18 to modem 42. Such selection enables the supplemental controller 32, rather than the master radio 14, to send response messages back to the master controller 12.

SRTU Communications

Figure 3:
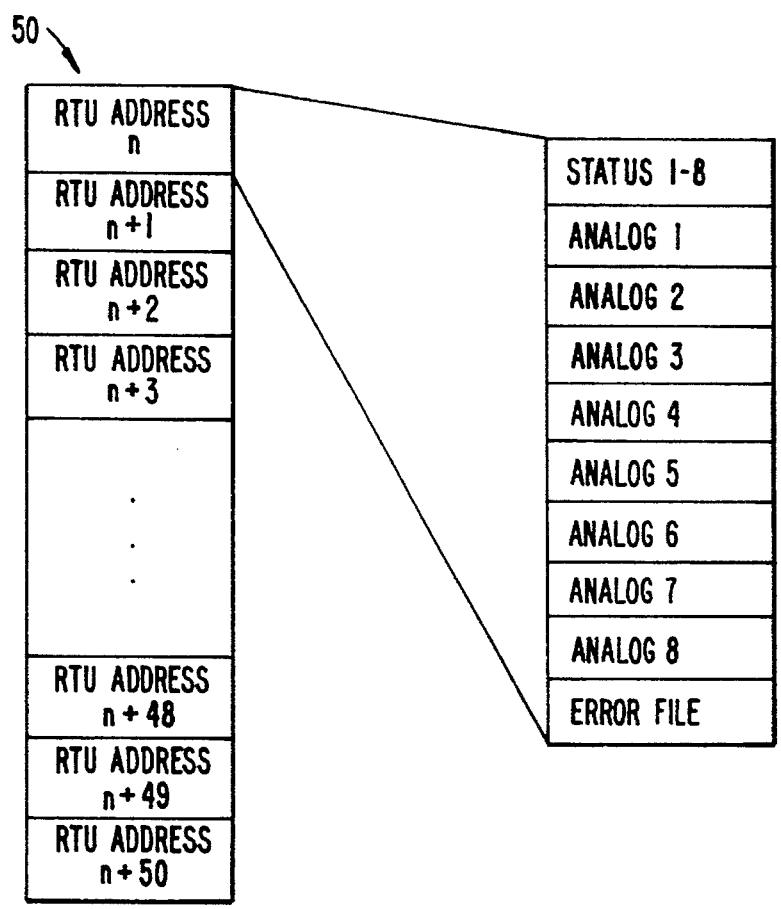
FIG. 3 is a block diagram of the SRTU database structure.

After disabling master radio transmission, the supplemental controller 32 has control of the link 18 and the 900 MHz radio channel. The supplemental controller 32 then initiates two operations. First, network communications are established to scan the population of SRTUs 34 and retrieve initial information for establishing an SRTU data base 50 (FIG. 3). Second, the supplemental controller 32 responds to scan requests originating from the master controller 32.

The SRTU data base serves as a mailbox interface between multiple supplemental controller processing tasks. FIG. 3 shows the SRTU database 50 format. According to one embodiment, the supplemental controller 32 responds to a 51 SRTU address space (i.e., 50 SRTUs plus one dummy address). Such addresses are shown as RTU address "n" through RTU address "n+50". For each address, various fields are provided, including status indicators 1–8, analog signals 1–8 and an error file. Each RTU 22 and SRTU 34 is controllable to respond with status information and analog information. For a failed communication, the RTU 22, SRTU 34 responds with an error file including one or more error codes.

RTU Communications

For communications to an RTU 22, the supplemental master controller 32, while monitoring communications from the master controller 12, determines that the communication is not for one of the units 34 in the supplemental controller 32 address space. Accordingly, the master radio 14 remains, or becomes, enabled to transmit the message 120. Additionally, the switch 38 couples the microwave link 18 to the master radio 14. When the RTU 22 responds, then the master radio 14 relays the message to the master controller 12 through the switch 38 and over the microwave link 18.

Supplemental Controller Tasks

Figures 4, 4A:
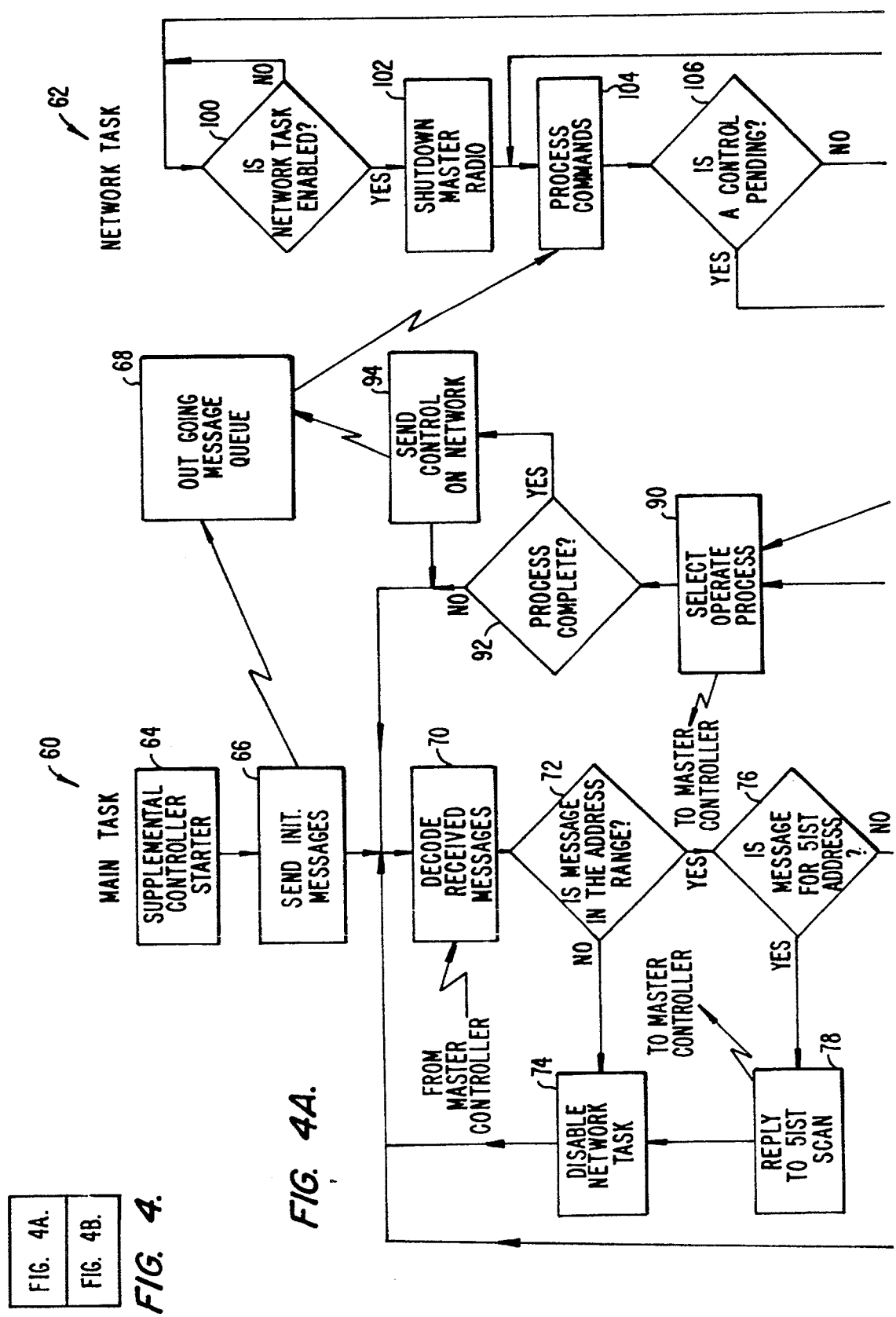
FIGS. 4, 4A and 4B are flow chart of the supplemental controller processing tasks.
Figure 4B:
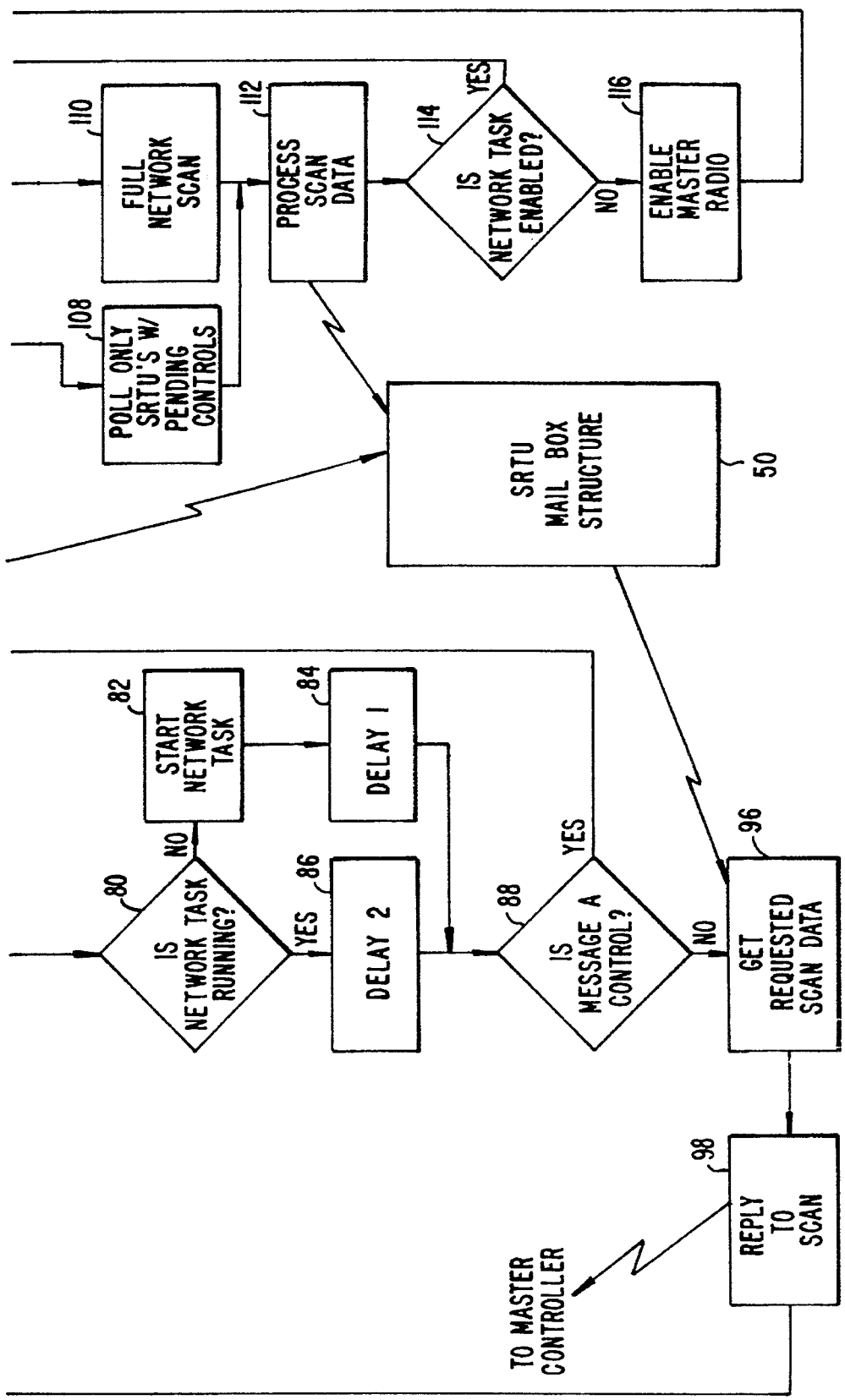

FIG. 4 shows a flow chart of the supplemental controller 32 main task 60 and network task 62. First, with regard to the main task 60, initialization is performed at startup step 64. After startup, initialization messages are generated at step 66 for transmission to the SRTUs 34. Such initialization messages are entered into an outgoing message queue 68. The queue 68 is accessed by the network task 62 which controls communications to and from the SRTUs 34. The message (e.g., supplemental controller message) is transmitted by a radio (not shown) of the supplemental controller 32 through the combiner 40 (FIG. 2) to the SRTUs 34 or sub-controllers 36. Next, at step 70 transmissions from the master controller 12 are monitored and decoded. At step 72, the transmission is tested to determine whether the message is directed to an SRTU 34 in the supplemental controller's address space. If not, then the network task 62 disabled at step 74 and the monitoring and testing steps 70, 72 are executed again. If yes, then at step 76, the transmission is tested to determine whether the message is for the last address in the supplemental controller 32 address space (e.g., dummy address).

If the message is for the last SRTU in the address space, then a null message is sent to the master controller 12 at step 78. Thereafter, the network task 62 is disabled (step 74) and the monitoring and testing steps 70, 72 are repeated.

If the master controller message is not for the last address, then at step 80, it is determined whether the network task 62 is running. If not running, then the network task 62 is started at step 82, followed by a delay at step 84. Such delay is adjustable between 0 and 1 seconds so as to optimize delays caused by the supplemental controller 32 modem (not shown). If yes, then the main task executes a delay at step 86 so as to optimize channel usage. Such delay also is adjustable between 0 and 1 seconds. Following the delay of either step 84 or step 86, the message is tested at step 88 to determine whether the message corresponds to a supervisory control function or a scan function.

If a supervisory control function, then the specific control function is processed at step 90. If processing of the specific control function is complete before the next step, then step 92 leads to formation of command messages at step 94 which are queued in the message queue 68. Such command messages are identified by the network task 62 which sends the message (e.g., supplemental controller message) to the appropriate SRTUs 34. If processing does not complete before the next step, then step 92 leads to the repeating of the monitoring and testing steps 70, 72.

If the message from the master controller 12 identifies a scan function, then at step 96 the SRTU database 50 is accessed to retrieve the scan information for the appropriate SRTU 34. The supplemental controller 32 then generates at step 98 a response message to be sent to the master controller 12. Thereafter, the monitoring and testing steps 70, 72 are again executed to test the next master controller message.

The network task 62 is enabled or disabled by the main task 60 as described above. At step 100, the network task status is tested to identify whether the network task 62 is disabled. If disabled, then the network task executes a loop in which step 100 is repeated. When the network task is enabled, the master radio 14 is disabled at step 102. Messages in the outgoing message queue 68 then are processed at step 104. If a control function is pending as identified in step 106, then the SRTUs 34 identified in such control function messages are polled at step 108. If a control function is not pending, then all the SRTUs are scanned at step 110. The SRTU responses to the scan requests then are processed at step 112. Such processing includes storing the scan information in the SRTU database 50 for access by the main task 60. After the scan data is processed at step 112, the status of the network task 62 is tested at step 114. If enabled, then the next command is processed at step 104. If disabled, then the master radio is re-enabled at step 116. Thereafter, the network task repeatedly tests the network task status at step 100 until the network task is once again enabled.

Attached in appendix A is a computer program listing of source code for implementing and maintaining the mailbox communication structure between the main task and network task of the supplemental controller 32.

Master Controller Message Format

Figure 5:
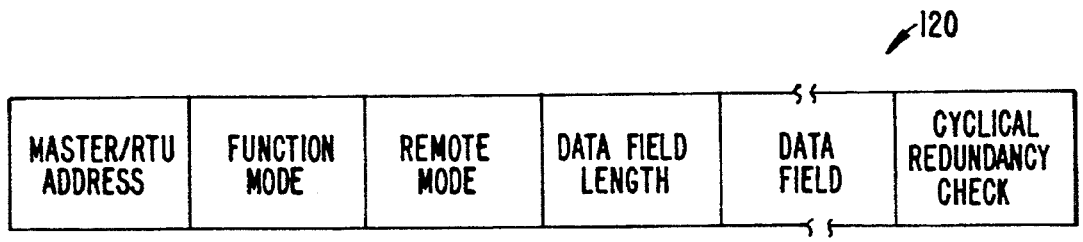
FIG. 5 is a chart of the master controller message format.

A message format for messages generated by the master controller 12 is shown in FIG. 5. The master controller message 120 includes a two-character address field, a one-character function code field, a one-character command field, a two-character data-field-length field, a variable length data field and a two-character cyclical redundancy check field. The character format used is an asynchronous 1200 baud, 8 data-bit, one stop-bit, no parity format, although other formats may be implemented.

The address field identifies the master controller address and the destination RTU 22, SRTU 34 address. The supplemental controller 32 monitors the master controller transmissions to identify messages 120 having an address in the SRTU address space. According to a specific embodiment, fifty SRTUs are supported. Upon detecting an SRTU address, the supplemental controller 32 communicates with the master controller as if it were the addressed SRTU. As described, the supplemental controller 32 decodes the communication, forwards a message to the SRTU and receives the response. The response is stored by the network task 62 in the SRTU database. The main task 60 then accesses the database 50 to generate a response message to be sent back to the master controller 12.

A 51st address is used to signal the supplemental controller 32 to enter standby mode (e.g., enable master radio 14 and have switch 18 select master radio). In addition, a message having an address outside the 50 address space also causes the supplemental controller 32 to enable the master radio 14 and to have switch 18 select the master radio 14 transmission channel.

The function code field of the message 120 specifies either a basic scan operation, a supervisory control operation, a return unit configuration or other operation. The command field specifies the specific operation within the function that the RTU 22 or SRTU 34 is to perform.

The scan function is used to retrieve information from an RTU 22 or SRTU 34. Depending on the command used with the scan function, the unit 22, 34 responds by sending a message having a data field which includes a simple status and a two-bit status change. The data field also may include analog data in packed or unpacked format. The simple status is the status of the SRTU status input when scanned. The 2-bit status change is the instantaneous status along with a change bit for indicating multiple changes of state between scans. Packed analog format is used for keeping response time to a minimum.

Response Message Format

Figure 6:
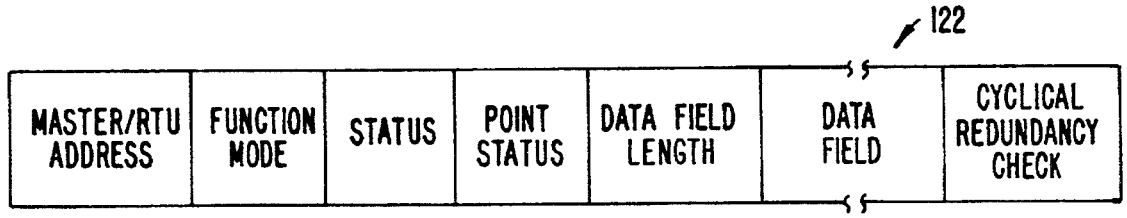
FIG. 6 is a chart of a response message format.

FIG. 6 shows the response message 122 format generated by the supplemental controller 32 or an RTU 22. The message 122 includes a two-character master-RTU address field, a one-character function code field, a one-character status field, a one-character port status field, a two-character data-field-length field, a variable length data field and a two-character cyclical redundancy check field. The character format used is an asynchronous 1200 baud, 8 data-bit, one stop-bit, no parity format, although other formats may be implemented.

The master-RTU address field specifies the address of the polling master controller 12 and the responding RTU 32 (SRTU 34). The function code generally is the same function code as sent by the master controller 12. The port status field includes flags for indicating the current RTU or SRTU status (i.e., needs to be configured by master controller 12; error— see error file database 50): The port status field identifies the status of the communication channels. The data length field indicates the number of characters in the data field. The data field includes a variable length field of information requested by the master controller 12. The CRC field indicates the cyclical redundancy check of all characters in the message.

Supervisory Control Functions

The supplemental controller 32 responds to the master controller messages 120 as if the unit addressed. To do so, the supplemental controller 32 verifies the operational status of the SRTU addressed and generates the appropriate response message 122. The controller 32 communicates with the addressed SRTU 34 maintaining a tight polling loop to assure that the status change is relayed to the SRTU database 50.

The supervisory control functions include: control select open, control select close, reset select and pulse selected point. Control select open is a select-before-operate function for contact-open operations. The master controller 12 sends the "select" function with the desired sequence number to the RTU or supplemental controller, which in response echoes the request for verification. The master controller 12 then sends a pulse selected point function to the RTU 22 or SRTU 34 (via the supplemental controller 32), which operates the selected point.

When an RTU 22 or SRTU 34 receives an open command, it verifies that the sequence number is valid and ensures that no other select operation is active. If the sequence number is invalid or there is another select active, then the RTU 22 or SRTU 34 returns a restart code to the master controller 12. If the select is accepted, an echo of the master controller's message 120 is sent, and the RTU 22 or SRTU 34 sets a 3–6 second timeout period for the master controller 12 to send a "pulse selected point" function. The RTU 22, SRTU 34 then cancels the select function after the timeout period and responds to a subsequent "pulse selected point" command with a no-operation code.

Control select close is a select-before-operate function for a contact close operation. The master controller 12 passes the sequence number of the desired output point using such function. The master controller 12 sends the "select" function with the desired sequence number to the RTU 22, SRTU 34. The RTU 22, SRTU 34 echoes the master controller 12 request for verification. The master controller 12 then sends a "pulse selected point" function to the RTU 22, SRTU 34 and the RTU 22, SRTU 34 closes the selected point.

When the RTU 22, SRTU 34 receives the "close" command, it verifies that the sequence number is valid and ensures that no other operation is active. If the sequence number is invalid, then the RTU 22, SRTU 34 returns a no-operation code in the response. If there is already a select active, then the RTU 22, SRTU 34 returns a reset code. If the select is accepted, an echo of the master controller message 120 is sent, and the RTU 22, SRTU 34 sets an approximately 5 second timeout period for the master controller 12 to send a "pulse selected point" function. The RTU 22, SRTU 34 cancels the select function after the timeout period and responds to a subsequent "operate" command with a no-operation code.

After the master controller 12 receives an open or close verify message from the RTU 22, SRTU 34, the master 12 sends a "pulse selected point" message which causes the RTU 22, SRTU 34 to perform the selected function. The "pulse selected" message is to be received within 5 seconds after the RTU 22 sends the verify message or a timeout and abort occurs. If the master controller 12 subsequently sends a "pulse selected" message, the RTU 22, SRTU 34 responds with a no-operation code and takes no action. If the master controller 12 sends any other type of message to the RTU 22, 34 while there is a select active, the RTU 22, SRTU 34 resets the select function and responds with a reset code.

Normally, the SRTU contacts are open. Upon successful completion of a control sequence, the SRTU 34 closes the specific point for the programmed duration. Such mode applies to both select open and select close functions for the pulse selected point function.

If, the master controller 12 decides to abort the selected operation, a reset function is issued to the RTU 22, SRTU 34, which immediately cancels the select.

Conclusion

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A distributed radio communication and control system, comprising:

master control means for controlling communications with a plurality of remotely-located first stations and a plurality of remotely-located second stations, each of said first stations having a first station address and each of said second stations having a second station address, the master control means generating master control means messages, each said message having a destination address;

master radio means, adapted to receive said master control means messages, for transmitting a master control means message to one of said first stations when one of said first station addresses corresponds to said destination address and for sending a response message to said master control means from said one first station;

supplemental control means for monitoring said master control means messages and for determining whether one of said second station addresses corresponds to said destination address, said supplemental control means transmitting a supplemental control means message to one of said plurality of remotely-located second stations when said one of said second station addresses corresponds to said destination address, said supplemental control means sending a response message to said master control means based upon a response from said one of said plurality of remotely-located second stations to said supplemental control means message;

means for selectively coupling either one of a master radio means communication channel and a supplemental control means communication channel to said master control means across which a response message is sent;

wherein said supplemental control means controls the coupling means to select the supplemental control means communication channel when said destination address corresponds to a second station address; and means for coupling said master radio means and said supplemental radio means to a given antenna.

2. A distributed radio communication and control system, comprising:

master control means for controlling communications with a plurality of remotely-located first stations and a plurality of remotely-located second stations, each of said first stations having a first station address and each of said second stations having a second station address, the master control means generating master control means messages, each said message having a destination address;

master radio means, adapted to receive said master control means messages, for transmitting a master control means message to one of said first stations when one of said first station addresses corresponds to said destination address and for sending a response message to said master control means from said one first station;

supplemental control means for monitoring said master control means messages and for determining whether one of said second station addresses corresponds to said destination address, said supplemental control means transmitting a supplemental control means message to one of said plurality of remotely-located second stations when said one of said second station addresses corresponds to said destination address, said supplemental control means sending a response message to said master control means based upon a response from said one of said plurality of remotely-located second stations to said supplemental control means message;

means for selectively coupling either one of a master radio means communication channel and a supplemental control means communication channel to said master control means across which a response message is sent;

wherein said supplemental control means controls the coupling means to select the supplemental control means communication channel when said destination address corresponds to a second station address; and said master radio means is disabled from transmittings a master control means message to a first station when one of said second station addresses corresponds to said destination address.

3. The system of claim 2, in which said master radio means is enabled for transmitting a master control means message to a first station when one of said second station addresses does not correspond to said destination addresses.

4. The system of claim 3 in which said supplemental control means controls said disabling and enabling of said master radio means.

5. A distributed radio communication and control system, comprising:

master control means for controlling communications with a plurality of remotely-located first stations and a plurality of remotely-located second stations, each of said first stations having a first station address and each of said second stations having a second station address, the master control means generating master control means messages, each said message having a destination address;

master radio means, adapted to receive said master control means messages, for transmitting a master control means message to one of said first stations when one of said first station addresses corresponds to said destination addresses and for sending a response message to said master control means from said one first station;

supplemental control means for monitoring said master control means messages and for determining whether one of said second station addresses corresponds to said destination address, said supplemental control means transmitting a supplemental control means message to one of said plurality of remotely-located second stations when said one of said second station addresses corresponds to said destination address, said supplemental control means sending a response message to said master control means based upon a response from said one of said plurality of remotely-located second stations to said supplemental control means message;

means for selectively coupling either one of a master radio means communication channel and a supplemental control means communication channel to said master control means across which a response message is sent;

wherein said supplemental control means controls the coupling means to select the supplemental control means communication channel when said destination address corresponds to a second station address; and said master radio means and said supplemental control means are located at a common site remote from said master control means.

6. A distributed radio communication and control system, comprising:

master control means for controlling communications with a plurality of remotely-located first stations and a plurality of remotely-located second stations, each of said first stations having a first station address and each of said second stations having a second station address, the master control means generating master control means messages, each said message having a destination address;

master radio means, adapted to receive said master control means messages, for transmitting a master control means message to one of said first stations when one of said first station addresses corresponds to said destination address and for sending a response message to said master control means from said one first station;

supplemental control means for monitoring said master control means messages and for determining whether one of said second station addresses corresponds to said destination address, said supplemental control means transmitting a supplemental control means message to one of said plurality of remotely-located second stations when said one of said second station addresses corresponds to said destination address, said supplemental control means sending a response message to said master control means based upon a response from said one of said plurality of remotely-located second stations to said supplemental control means message;

means for selectively coupling either one of a master radio means communication channel and a supplemental control means communication channel to said master control means across which a response message is sent;

wherein said supplemental control means controls the coupling means to select the supplemental control means communication channel when said destination address corresponds to a second station address;

wherein said supplemental control means comprises means for executing a main task for monitoring said master control means messages;

means for executing a network task for communicating with said one second station;

data interface means between said main task and said network task for storing second station response information, said network task gathering said response information, said main task accessing said response information to generate a response message to be sent to said master control means; and said data interface means comprises a data table of sections, each section of the table allocated to store response information for one of said plurality of second stations.

7. The system of claim 6, in which said response information comprises status data, error data, and digitized representations of analog data.

8. A distributed radio communication and control system, comprising:

master control means for controlling communications with a plurality of remotely-located first stations and a plurality of remotely-located second stations, each of said first stations having a first station address and each of said second stations having a second station address the master control means generating master control means messages, each said message having a destination address;

master radio means adapted to receive said master control means messages for transmitting said master control means message to one of said first stations when one of said first station addresses corresponds to said destination address and for sending a response message to said master control means from said one first station;

supplemental control means for monitoring said master control means messages and for determining whether one of said second station addresses corresponds to said destination address, said supplemental control means transmitting a supplemental control means message to one of said plurality of remotely-located second stations when said one of said second station addresses corresponds to said destination address, said supplemental control means sending a response message to said master control means based upon a response from said one of said plurality of remotely-located second stations to said supplemental control means message; and means for selectively coupling either one of a master radio means communicating channel and a supplemental control means communication channel to said master control means across which a response message is sent;

wherein said supplemental control means controls the coupling means to select the supplemental control means communication channel when said destination address corresponds to a second station address; and wherein said supplemental control means comprises:

a) means for executing a main task for monitoring and testing said master control means messages;

b) means for executing a network task for communicating with said one second station; and c) data interface means between said main task and said network task for storing second station response information, said network task gathering said response information, said main task accessing said response information to generate a response message to be sent to said master control means.

9. The system of claim 8, in which said master radio means is disabled from transmitting a master control means message to a first station when one of said second station addresses corresponds to said destination address.

10. The system of claim 9, in which said master radio means is enabled for transmitting a master control means message to a first station when one of said second station addresses does not correspond to said destination address.

11. The system of claim 10, in which said supplemental control means controls said disabling and enabling of said master radio means.

12. The system of claim 11, in which said master radio means and said supplemental control means are located at a common site remote from said master control means.

* * * * *